United States Patent

[11] 3,587,382

[72] Inventor Harry S. Boyd
 Tulsa, Okla.
[21] Appl. No. 765,920
[22] Filed Oct. 8, 1968
[45] Patented June 28, 1971

[54] DIE FOR CUTTING PAPER
 8 Claims, 6 Drawing Figs.
[52] U.S. Cl. .................................................. 83/651,
 83/652, 83/698
[51] Int. Cl. ..................................................... B26d 1/02
[50] Field of Search .......................................... 83/651-
 —657, 663, 697, 698; 76/107, 107 (C)

[56] References Cited
 UNITED STATES PATENTS
| | | | |
|---|---|---|---|
| 1,114,384 | 10/1914 | Prime | 83/652X |
| 2,231,855 | 2/1941 | Stoddard et al. | 83/652 |
| 2,713,902 | 7/1955 | Biss | 83/652 |
| 2,899,849 | 8/1959 | Laughter et al. | 76/107 |
| 3,302,490 | 2/1967 | Bishop | 83/698X |
| 3,335,628 | 8/1967 | Simms et al. | 83/652 |
| 3,411,208 | 11/1968 | Malm | 83/652X |

FOREIGN PATENTS

| 75,477 | 2/1953 | Denmark | 83/651 |
|---|---|---|---|

Primary Examiner—William S. Lawson
Attorney—Head & Johnson

ABSTRACT: This invention relates to a die for cutting paper. More particularly, the invention relates to a paper cutting die formed of a thin elongated flexible metal strip positioned on a backing plate and held there by a reinforcing plate of severable material forced down over the metal cutting strip, the strip extending upwardly through the reinforcing plate, the reinforcing plate being bonded by adhesive to the backing plate.

PATENTED JUN 28 1971 3,587,382
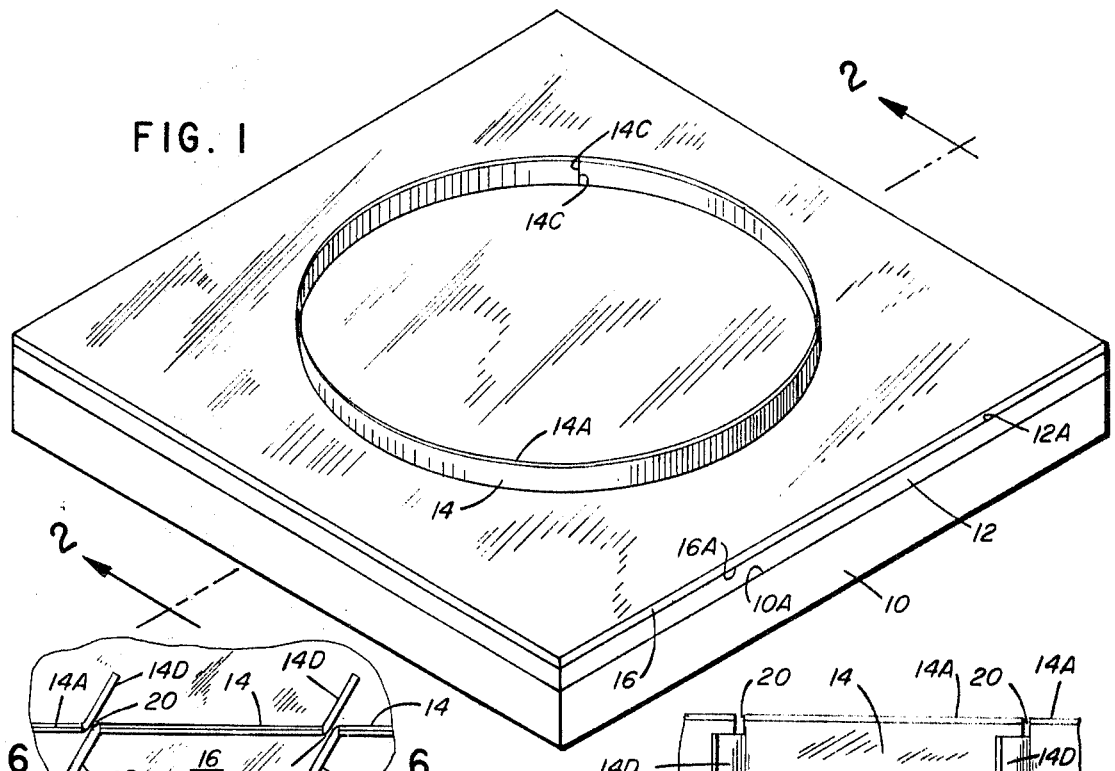
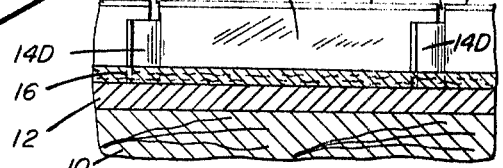
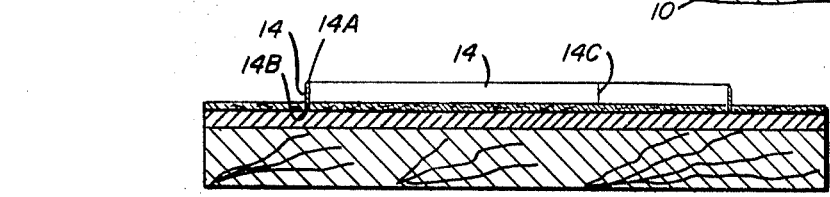
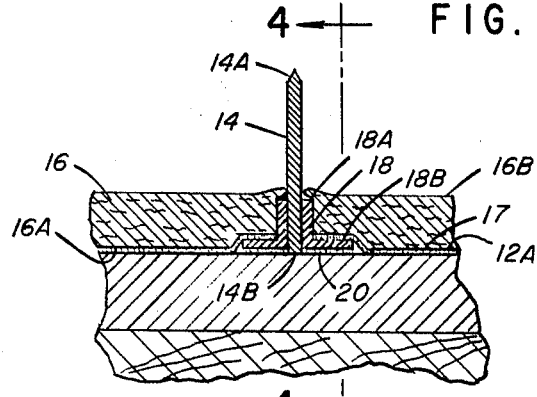
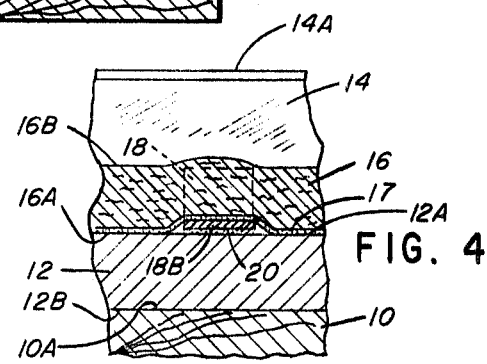
INVENTOR.
HARRY S. BOYD
BY
Head & Johnson
ATTORNEYS

DIE FOR CUTTING PAPER

CROSS-REFERENCE

This disclosure is not related to any pending United States or foreign patent application.

BACKGROUND AND SUMMARY OF THE INVENTION

In the printing industry it is frequently necessary to cut paper into various shapes and configurations. For instance, decals must be cut into all manners of sizes and shapes. The same applies to coupons, labels, and so forth. At this time the procedure for forming dies utilized to cut shapes is as follows: A piece of wood, such as plywood, of thickness approximately three-fourths of an inch, which may be termed a die block, is cut completely through in the desired configuration by means of a band or jig saw. Next, a cutting strip which is of height as measured from edge to edge greater than the thickness of the die block is positioned within the slit cut in the die block. The typical presently used cutting strip is 0.918 inch in height. The metal-cutting strip extends partially upwardly above the die block and is provided with a sharp cutting edge. The plate having the strip therein is then positioned on a press for the cutting operation.

This arrangement is completely satisfactory except for certain problems and limitations. One problem is that the work of making the die can be accomplished only by professional die makers having the required equipment. Putting it another way, the task of making dies for cutting various shapes is beyond the capabilities of printing shops. This requires shop owners to order dies from professional die makers resulting in costly delays.

This invention provides a die arrangement wherein a printing shop proprietor can make his own paper cutting dies without the necessity of referring his die requirements to professional die makers.

Another problem with the present type of die as used for cutting paper is that the relatively heavy cutting strip is difficult to form into intricate patterns. This invention provides a die for cutting paper which can be very easily formed into detailed or intricate patterns. Thus, by the use of this invention the professional die maker can more easily make dies of great intricacy.

It is therefore a primary object of this invention to provide improved paper cutting die.

More particularly, an object of this invention is to provide a paper cutting die for use by professional die makers or printing shop proprietors for cutting paper, plastic, or any such thin material, into regular or irregular shapes, the die being such that shop proprietors can assemble it themselves.

Another object of this invention is to provide a method and apparatus for making paper dies which permit a die maker or a printing shop proprietor to make dies to cut any desired shape without need for special tools, machinery or other equipment and particularly without the need for a jig saw or band saw. These general objects as well as more specific objects will be understood with reference to the following description and claims when taken in conjunction with the drawings.

DESCRIPTION OF THE VIEWS

FIG. 1 is an isometric view of a die of this invention shown arranged for cutting a circular shape.

FIG. 2 is a cross-sectional view taken along the line 2-2 of FIG. 1.

FIG. 3 is an enlarged fragmentary view showing the use of a small right-angle shape support element for holding the cutting strip in position during assembly of the die.

FIG. 4 is a cross-sectional view taken along the line 4-4 of FIG. 3

FIG. 5 is a partial top plan view of a die formed by an alternate embodiment of the invention.

FIG. 6 is a cross-sectional view taken along the line 6-6 of FIG. 5 showing a side view of the alternate embodiment.

DETAILED DESCRIPTION

Referring to the drawings, a die is shown in FIG. 1 which has been assembled according to the invention. The die shown is configured to cut a circle in a sheet of paper or any comparably thin material. By this invention the configurations which may be cut are virtually unlimited.

Basically the die of this invention is formed of a backing plate which preferably includes two portions, that is, a first portion 10 which may be of nonmetallic material, such as wood, and a second portion 12 which is preferably of hard material such as steel or plastic. The first portion 10 of the backing plate has an upper flat surface 10A upon which the second, hard portion 12 is affixed. The second portion 12 of the backing plate includes a flat upper surface 12A upon which is positioned a thin elongated flexible metal cutting strip 14. The cutting strip 14 is generally rectangular in cross section, as shown in FIGS. 2 and 3, and includes parallel opposed edges 14A and 14B. Edge 14A is configured into a sharp cutting edge. The opposite edge 14B engages the upper surface 12A of the backing plate second portion 12.

The cutting strip 14 is held in position by a reinforcing plate 16 which is comprised of some severable material, such as cardboard. Reinforcing plate 16 has a flat lower surface 16A which engages the upper surface 12A of the backing plate second portion. The reinforcing plate 16 is bonded to backing plate second portion 12 such as by means of adhesive. The function of the reinforcing plate 16 is to hold the cutting strip 14 in the preselected position. It also reinforces and increases the rigidity of the cutting strip.

In FIG. 1 the cutting strip is, as previously mentioned, formed in a circle to cut such configuration in a sheet of paper, the cutting strip 14 being cut to such length that the ends 14C are contiguous.

METHOD OF ASSEMBLY

When it is desired to make a die according to this invention the printing shop proprietor merely positions the cutting strip 14 on the upper surface 12A of the backing plate in the configuration desired. Such configuration may consist of straight lines, sharp bends, smooth curves such as in the circle as shown in FIG. 1, or any other arrangement. The cutting strip 14 is of relatively thin material and is easily bent by hand or with pliers into any desired shape. The lengths as desired can be cut with hand shears or strong scissors.

With the desired shape formed by the cutting strip 14 positioned on the backing plate upper surface 12A, the reinforcing plate 16 is forced down over the cutting strip 14. The upper cutting edge 14A is forced through the severable reinforcing plate. The reinforcing plate 16 is preferably provided with a self-bonding adhesive on the lower surface 16A thereof so that after the reinforcing plate is forced so that the cutting strip extends upwardly therethrough further downward pressure adheres the reinforcing plate to the backing plate. The reinforcing plate 16 is of a thickness less than the height of the cutting strip so that a portion of the cutting strip, including the upper cutting edge 14A, extends above the upper surface 16B of the reinforcing plate. By forcing the reinforcing plate down over the cutting strip 14 and bounding it to the backing plate the reinforcing strip 14 is firmly held in position and the die may then be placed in a press ready for cutting paper.

WHen a die constructed according to this invention is no longer needed the reinforcing plate 16 may be pulled off and the backing plate readily utilized for making a die of a different configuration. The strip 14 being of inexpensive construction may be discarded and a new strip utilized for forming a new die or, of course, if the strip is not badly bent or is not dull it may be utilized for forming a new die. The reinforcing plate 16 being of relatively cheap cardboard or the like means that a new die of any desired configuration can be made very quickly and easily be a printing shop proprietor on his own premises at very little expense.

FIGS. 3 and 4 show an enlarged cross-sectional view of a die constructed according to this invention, and further show an additional element of the invention. When the cutting strip 14 is first positioned on the upper surface 12A of the backing plate it may tend to fall to one side or the other. This is particularly true when long, straight lines are to be cut and is less of a problem where the shape to be cut is highly irregular. Where the configuration to be cut is such as to require one or more relatively long, straight lines a plurality of right-angle shape support elements 18 may be utilized. Each of the support elements 18 includes mutually perpendicular leg portions 18A and 18B. At least one of the legs 18A is of length less than the height of the cutting strip 14 and engages the cutting strip 14. The other leg 18B is provided with adhesive 20 on the lower surface. The support elements 18 are positioned against the cutting strip 14 as they are placed on the upper surface 12A of the backing plate to achieve the desired configuration. Adhesive on the lower surface of leg 18B holds the support element 18 and thereby the cutting strip 14 in proper position. As many or as few of the support elements 18 may be utilized as necessary to support the cutting strip in the desired position on the backing plate 12A. When the desired position of the cutting strip 14 is achieved the reinforcing plate 16 is pressed downwardly into position. In the arrangement of FIGS. 3 and 4 the thickness of the reinforcing plate 16 is approximately equal to or greater than the height of the leg 18A so that as it is pressed down over the cutting strip 14 it substantially covers the support elements 18 and further holding them in position to more securely lock the cutting strip 14 in position. It can be seen that in some arrangements the leg 18A of the support element 18 may be of length greater than the thickness of reinforcing plate 16 so that when the reinforcing plate 16 is in position the outer extremity of leg 18 may extend above it. Such will not interfere in any way with the use of the die so formed, the only requirement being that the length of the leg 18A is less than the height of the cutting strip 14 so as not to interfere with the cutting edge 14A.

The FIGS. and particularly FIGS. 3 and 4, show the typical application of the invention as greatly enlarged. In actual application the height of cutting strip 14 may be approximately 118 thousandth of an inch with the reinforcing plate 16B being cardboard of approximately 20 thousandth of an inch in thickness. The backing plate consisting of portions 10 and 12 may normally be of any desired thickness but in the practical arrangement will be of such thickness as to accept present type presses and therefore may generally be in the neighborhood of approximately 800 thousandth of an inch in thickness. This may be made up of a wood portion 10 of 750 thousandth of an inch in thickness and a second base portion 12 of 50 thousandth of an inch thickness. These dimensions provide a die of total height of 918 thousandth of an inch, a typical standard height for dies used in the printing industry.

The cutting strip 14 may be of 20 thousandth of an inch in thickness making it easy to bend and cut as required without special tools.

FIGS. 5 and 6 show an alternate embodiment of the invention. As previously mentioned a problem in assembling the die when a pattern requires a long straight line is that of retaining the cutting strip uprightly as the reinforcing plate is applied. To overcome this problem the cutting strip 10 may be formed in short lengths, such as one-half to 2 inches long. Each end portion of such short length of cutting strip is bent to form an integral angular portion 14D. The angular portions 14D are preferably bent in opposite directions as shown. The height of the angular portions 14D is reduced relative to the height of the main portion of the cutting strip, that is, the angular portions do not have a cutting edge. To form a straight line a series of such short lengths of cutting strip can be positioned on the upper surface 12A of backing plate second portion 12 and the reinforcing plate 16 forced down over the cutting strip and secured to the backing plate. The angular portion 14D cuts through the reinforcing plate even without a cutting edge since the cutting strip is preferably of relatively thin metal. If desired the upper edge of the angular portions 14D may be provided with a reduced height cutting edge (not shown) for the purpose of making it easier to force the reinforcing plate 16 over the cutting strip but such cutting surfaces would not take part in the final function of the die.

A series of the short lengths of cutting strip with integral angular portions 14D may be arranged so as to present a substantially uninterrupted cutting edge or they may be designed (as shown) to provide a small space 20 between each length to produce nicks or short lengths as uncut areas in the paper cut by the die.

The short lengths of cutting strip as shown in FIGS. 5 and 6 may have an integral angular portion 14D at only one end although the illustrated arrangement including angular portions at each end is preferred. The short lengths of cutting strip with integral angular ends of FIGS. 5 and 6 may be used in conjunction with one or more lengths of the elongated cutting strip of FIGS. 1 through 4 to achieve any desired die configuration.

The second portion 12 of the backing plate may, as previously stated, be made of hard material such as metal or plastic. By using clear plastic or glass, although plastic is obviously preferred because of the ease with which glass breaks, an important advantage of this invention is obtained. In making a die by this invention an obverse outline drawn on paper may be placed against the bottom side 12B of a clear backing plate second portion 12. The cutting strip 14 may then be placed on the top side 12A directly over the outline. The reinforcing plate 16 is then affixed over the cutting strip and secured such as by gluing to the top side 12A of the backing plate second portion. The paper having the obverse of the desired die outline thereon can be removed and the second portion 12 affixed to the first backing plate portion 10 and the die thereby completed without requiring the design to be traced or otherwise transferred to the die portions.

As previously described, the reinforcing plate 16 may be forced into position over the cutting strip 14, the cutting strip severing the reinforcing plate. If desired, the reinforcing plate 16 may be precut such as by a jig saw, die or otherwise, to receive the cutting strip. Such arrangement will ordinarily be used only if a large number of identical dies is to be made at one time. Since the reinforcing plate 14 need be of only relatively small thickness, several reinforcing plates can be precut simultaneously.

While the invention has been described with a certain degree of particularlity it is manifest that many changes may be made in the details of construction and the arrangement of components without departing from the spirit and scope of this disclosure. It is understood that the invention is not limited to the abstract herein, nor the summary, nor the illustrated embodiments which have been set forth for purposes of exemplifying the invention, but the invention is to be limited only by the scope of the attached claim or claims, including the full range of equivalency to which each element or step thereof is entitled.

I claim:

1. A die for cutting flat thin material, such as paper, into shapes, comprising:
   a backing plate having an upper flat surface;
   a thin elongated flexible cutting strip having paralleled opposed edges, one of the edges being configured to form a sharp cutting edge, the cutting strip being bent into the shape desired to be cut with the edge opposite the cutting edge being positioned in engagement with the upper flat surface of said backing plate;
   a reinforcing plate of severable material forced past the cutting edge of said cutting strip and secured, such as by adhesive, to said upper surface of said backing plate, the thickness of said reinforcing plate being less than the height of said cutting strip whereby the cutting edge extends above the reinforcing plate, the reinforcing plate serving to secure said cutting strip in upright position in the shape desired to be cut, and said backing plate includes two portions, the first portion being a plate of nonmetallic material, such as wood, and having an upper flat surface, the second portion being a flat plate of hard material, such as metal or plastic, having a flat upper and lower surface, the lower surface being affixed to said upper surface of said first portion, said cutting strip having engagement with said second portion and said reinforcing plate being secured to the upper surface of said second portion.

2. A die for cutting flat thin material, such as paper, into shapes, comprising:
a backing plate having an upper flat surface;
a thin elongated flexible cutting strip having paralleled opposed edges, one of the edges being configured to form a sharp cutting edge, the cutting strip being bent into the shape desired to be cut with the edge opposite the cutting edge being positioned in engagement with the upper flat surface of said backing plate;
a reinforcing plate of severable material forced past the cutting edge of said cutting strip and secured, such as by adhesive, to said upper surface of said backing plate, the thickness of said reinforcing plate being less than the height of said cutting strip whereby the cutting edge extends above the reinforcing plate, the reinforcing plate serving to secure said cutting strip in upright position in the shape desired to be cut; and
a plurality of right-angle shaped support elements of short length relative to said cutting strip, each having two mutually perpendicular legs, at least one of said legs being of less length than the height of said cutting strip, and being in engagement with said cutting strip, the other of said legs having adhesive on the lower surface thereof and being in engagement with said backing plate, said support elements serving to hold said cutting strip perpendicular relative to said backing plate upper flat surface.

3. A die for cutting flat thin material, such as paper, into shapes, comprising:
a backing plate having an upper flat surface;
a thin elongated flexible cutting strip having paralleled opposed edges, one of the edges being configured to form a sharp cutting edge, the cutting strip being bent into the shape desired to be cut with the edge opposite the cutting edge being positioned in engagement with the upper flat surface of said backing plate;
a reinforcing plate of severable material forced past the cutting edge of said cutting strip and secured, such as by adhesive, to said upper surface of said backing plate, the thickness of said reinforcing plate being less than the height of said cutting strip whereby the cutting edge extends above the reinforcing plate, the reinforcing plate serving to secure said cutting strip in upright position in the shape desired to be cut; and
an integral angular portion extending at an angle to one end of said cutting strip, the height as measured from edge to edge of said angular portion being less than the height of the cutting strip, said angular portion serving to support the cutting strip in upright position on said upper surface of said backing plate.

4. A die according to claim 3 wherein said cutting strip has a said integral angular end portion at each end thereof, said angular portions extending to opposite sides.

5. An element for use in forming dies for cutting thin material, such as paper, into selected shapes, comprising a thin elongated metal strip having paralleled top and bottom edges, the top edge being configured into a sharp cutting edge, the bottom edge being adaptable to be secured against a supporting surface, the strip having a reduced height integral angular portion extending at an angle relative to the plane of the strip from each end, the angular portions extending to opposite sides of the strip.

6. A method of making a die for cutting flat thin material, such as paper, into shapes comprising the steps of:
positioning a thin elongated flexible cutting strip having a sharp edge and a flat edge onto the surface of a backing plate, the flat edge of the cutting strip engaging the backing plate;
positioning a reinforcing plate of severable material of a thickness less than the height of the cutting strip against the sharp edge of the cutting strip;
applying pressure on the reinforcing plate to force the reinforcing plate past the cutting strip and into engagement with the surface of the backing plate so that the sharp edge of the cutting strip extends through the reinforcing plate; and
securing the reinforcing plate to the backing plate.

7. A method of making a die according to claim 6 including the initial step of applying adhesive to the surface of the backing plate or the reinforcing plate, the adhesive serving to secure the reinforcing plate to the backing plate.

8. A method of making a die according to claim 7 including the step of positioning a plurality of angular support elements against the surface of the backing plate and against the cutting strip before the step of positioning the reinforcing plate against the sharp edge of the cutting strip, the angular support elements serving to assist in holding the cutting strip in upright position as the reinforcing plate is forced past the cutting strip.